Jan. 23, 1968

H. W. KOGELNIK 3,365,671

MULTIPLE-PASS MOLECULAR LASER AMPLIFIER
WITH MASKING TO PREVENT OSCILLATIONS

Filed July 12, 1966

INVENTOR
H. W. KOGELNIK
BY David P. Kelley
ATTORNEY

FIG. 5

| BOUNCES $t$ | $\theta$ | $\omega$ | * MASK ROTATION | ‡ $\eta$ |
|---|---|---|---|---|
| 5 | $\frac{2}{3}\pi = .667\pi$ | $\frac{2}{3}\pi$ | $\frac{2}{3}\pi$ | $\frac{8}{9} = .89$ |
| 9 | $\frac{5}{13}\pi = .384\pi$ | $\frac{4}{13}\pi$ | $\frac{5}{13}\pi$ | $\frac{32}{39} = .82$ |
| 11 | $\frac{2}{7}\pi = .285\pi$ | $\frac{2}{7}\pi$ | $\frac{2}{7}\pi$ | $\frac{20}{21} = .95$ |
| 13 | $\frac{3}{11}\pi = .273\pi$ | $\frac{2}{11}\pi$ | $\frac{3}{11}\pi$ | $\frac{8}{11} = .73$ |
| 17 | $\frac{3}{13}\pi = .231\pi$ | $\frac{2}{13}\pi$ | $\frac{3}{13}\pi$ | $\frac{32}{39} = .82$ |
| 19 | $\frac{8}{13}\pi = .615\pi$ | $\frac{2}{13}\pi$ | $\frac{8}{13}\pi$ | $\frac{12}{13} = .92$ |

‡ $\eta = \dfrac{\omega}{3\pi/(t-1)}$

* MASKED AREAS INCLUDING INPUT OR OUTPUT HOLES

United States Patent Office 3,365,671
Patented Jan. 23, 1968

3,365,671
MULTIPLE-PASS MOLECULAR LASER AMPLIFIER WITH MASKING TO PREVENT OSCILLATIONS
Herwig W. Kogelnik, Summit, N.J., assignor to Bell Telephone Laboratories, Incorporated, Berkeley Heights, N.J., a corporation of New York
Filed July 12, 1966, Ser. No. 564,599
9 Claims. (Cl. 330—4.3)

This invention relates to optical maser devices and, more particularly, to optical maser amplifiers.

Optical maser amplifiers in general produce amplification of an incident light beam as it makes a single pass through the active medium. In many cases, such as at certain wavelengths, the optical maser operative at the particular wavelength does not produce much gain on a single traversal of light through the medium. In such cases, several amplifiers may be cascaded to produce a cumulative gain that satisfies the requirements of the particular system in which the amplifiers are used.

In U.S. Patent 3,253,226 of D. R. Herriott, H. W. Kogelnik and R. Kompfner, there is shown an arrangement wherein multiple off-axis paths in an optical maser amplifier are utilized to permit multiple passes of a light beam through the amplifying medium. Such an arrangement produces enhanced gain and, in many cases, eliminates the need for cascading. In any such arrangement, however, where an active medium is situated between two reflecting surfaces, under certain conditions oscillations can occur with a consequent degrading of amplifier performance.

The present invention makes use of multiple transits in an optical maser as, for example, in the aforementioned Herriott et al. patent, but is so constructed that oscillations do not occur.

The invention is based upon the phenomenon that if a nonreflecting body or surface is inserted into a resonator formed by a pair of reflecting surfaces and in which, for example, is an active medium, the light output resulting from oscillations within the resonator will show two shadow areas corresponding to the non-reflecting surface and its mirror image. Thus, for example, if a wedge-shaped mask is placed on one of the mirrors of the resonator, the oscillatory output will show a pair of wedged-shaped shadow areas diametrically opposed to each other about a center of symmetry in the light pattern emerging from the resonator. Applicant has found that this principle makes possible the elimination of oscillations without the necessity of completely making one or both of the mirrors of the resonator. As a consequence, sufficient reflecting area on both mirrors remain to permit multiple passes of a beam to be amplified without the onset of oscillations.

In an illustrative embodiment of the invention, an optical maser comprises first and second reflecting surfaces or mirrors having an active medium disposed therebetween, and suitable means for exciting the active medium. One of said mirrors is apertured to permit introduction into the system of a light beam to be amplified, and the other mirror is apertured to permit abstraction of the amplified beam. In accordance with the principles of the invention, the entrance aperture subtends an arc of 120° on the mirror surface and the exit aperture likewise subtends a 120° arc. The centerline of the exit aperture is rotationally displaced 120° relative to the centerline of the entrance aperture about the resonator centerline. As will be explained more fully hereinafter, these two apertures, which are non-reflecting and hence functionally equivalent to masks, produce a total masking of oscillations within the resonator, but permit the incident beam to make five traversals of the active medium before passing through the exit aperture.

In various other illustrative embodiments, different masking patterns permit different numbers of traversals of the beam.

It is a feature of the present invention that oscillations are completely suppressed by masking one or both mirrors to a minimum of 25 percent of the total combined area available for reflection of the two mirrors.

It is another feature of the invention that where both mirrors are masked, the masking pattern on one mirror is rotated, relative to the pattern on the other mirror.

The various principles and features of the invention will be more readily apparent from the following detailed description, read in conjunction with the drawings, in which:

FIG. 5 is a chart tabulating various parameters of a laser system under different operating conditions.

Figure 1:
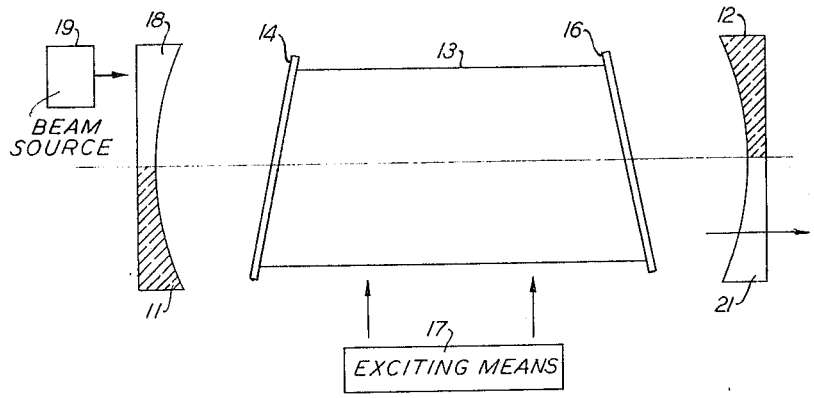
FIG. 1 is a diagrammatic view of an optical maser arrangement embodying the principles of the invention.

FIG. 1 is a diagrammatic depiction of one illustrative embodiment of the invention, which comprises a cavity resonator formed by first and second spherical mirrors 11 and 12, shown in cross section. Mirrors 11 and 12 are spaced from each other a distance $d$ which is different from the confocal distance, i.e., the radius of curvature. Preferably mirrors 11 and 12 have the same radius of curvature R, but this is not absolutely necessary. As a matter of fact, the principles of the invention apply equally as well to resonators formed with one curved and one flat mirror.

Disposed within the resonator and coaxial therewith is a transparent tubular member 13 of quartz or other suitable material and which is sealed at its ends by transparent windows 14 and 16 oriented at Brewster's angle, a technique well known in the art. An active medium is contained within member 13 which may be, for example, carbon dioxide ($CO_2$) or other suitable material. The active medium is excited to the laser condition, i.e., negative temperature state, by any suitable means known in the art, depicted diagrammatically by box 17.

Mirror 11 is provided with an input aperture 18 through which a light beam from a source 19 is directed into the cavity resonator in a direction such that the beam will be multiply reflected by mirrors 11 and 12, making several transits of the active medium before exiting through an exit aperture 21 in mirror 12. As explained in the aforementioned Herriott et al. patent, it is possible to direct the beam into the resonator so that its points of incidence and reflection on either mirror describes, for example, a circle or an ellipse or other figure. For purposes of illustration, in the embodiment of FIG. 1 it will be assumed that the beam describes a circle of spots on both mirrors.

Figure 2:
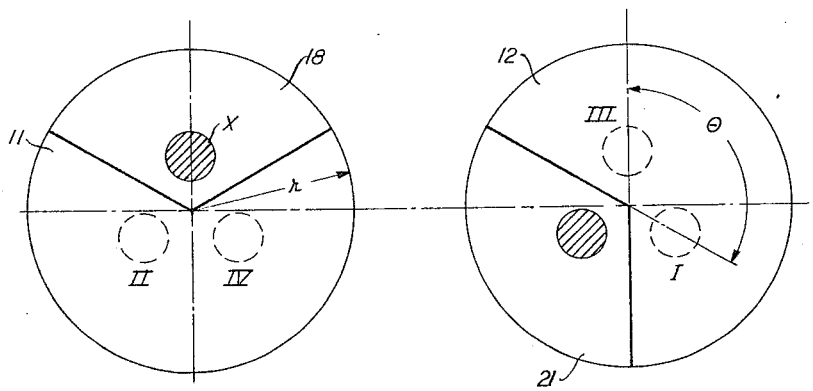
FIG. 2 is a view of the mirrors used in the arrangement of FIG. 1.

In FIG. 2 are shown the two areas of the two mirrors 11 and 12 as seen looking down the optic axis of the system, for purposes of illustrating the principles of the invention. Input aperture 18 of mirror 11 is a sector of a circle and covers an angle of 120 degrees. It is to be understood that by "aperture" is meant any means by which the beam may be passed through the mirror. It may be simply a transparent, non-reflecting portion of the mirror or an actual cut-out in the mirror, for example. The face of the mirror 11, of a total area $\pi r^2$ where $r$ is the radius, is reflective at the frequency of the light beam except for the sector 18. In a like manner, mirror 12 is reflective except for the sector 21 which represents the exit aperture for the beam.

In operation, a light beam to be amplified is directed from source 19 through entrance aperture 18 into the resonator, as depicted by the shaded circle $x$. The beam traverses the excited active medium and impinges on mirror 12 at point I as indicated by the dotted circle. The rotational angle $\theta$ between the point of entrance of the beam and point I is given by the expression $$\cos \theta = 1 - \frac{d}{2f} \qquad (1)$$

where $f$ is the focal length of mirrors 11 and 12 and $d$ is the distance separating them. At point I the beam is reflected by mirror 12, traverses the active medium, and impinges on mirror 11 at point II as indicated by the dotted circle, which is rotationally removed, from point I by the angle $\theta$. From point II the beam is reflected back through the active medium and impinges on mirror 12 at point III, rotationally displaced from point II by the angle $\theta$. The beam is again reflected through the active medium to point IV on mirror 11, then back through the medium and exits through sector 21 in mirror 12. From the foregoing, it can be seen that the beam makes five amplifying passes through the active medium and does not become reentrant.

In an optical maser amplifier, it is usually highly desirable that oscillations do not occur. For this reason, many amplifiers do not utilize mirrors and rely on a single traversal of the medium by the beam for gain. Where the active medium is such that a single traversal does not produce sufficient gain and cascading is undesirable, multiple passes through the active medium may be used, as discussed in the aforementioned Herriott et al. patent. However, multiple passes require mirrors, and mirrors can produce oscillations. In the arrangement of FIG. 1, if oscillations within the resonator were to occur, the signal being amplified, i.e., the beam from source 19, would be degraded or possibly destroyed, and, at the very least, the amplification process would be inefficient. Oscillations can be suppressed by "total masking" which, in effect, amounts to eliminating reflections for oscillatory modes. The single pass amplifier is an extreme case of "total masking" where the mirrors are simply removed.

In accordance with the principles of the present invention, total masking is achieved without elimination of the mirrors or generally without even masking a major portion of their reflecting surfaces, which must be available for the achievement of multiple passes.

Figure 3A:
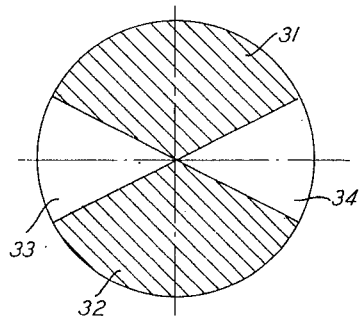
FIGS. 3A through 3C are views of laser outputs for the purpose of illustrating a feature of the invention.

In an optical maser wherein the resonator has at least one curved mirror, and where at least one of the mirrors is, for example, partially transmitting and partially reflecting, the output light shows an oscillatory mode pattern whose cross sectional area is approximately the same as the area of the mirrors over which reflections occur. If an opaque object is inserted into the resonator in front of one of the mirrors, the output pattern shows the shadow of this object. In addition, the output pattern shows a second shadow that is the mirror image of the first. Within these shadow areas there is no light, i.e., oscillations in these areas have been masked out. FIG. 3A depicts the output pattern that would be produced if only mirror 11 of FIGS. 1 and 2 had a sector 18 that was non-reflecting. (A non-reflecting area on a mirror is the equivalent of a mask.) It can be seen that the pattern of FIG. 3A has a first shadow area 31 corresponding to aperture 18 and a second shadow area 32 that is the mirror image of area 31. No oscillatory light exists in these areas. Light does exist, however, in areas 33 and 34.

Figure 3B:
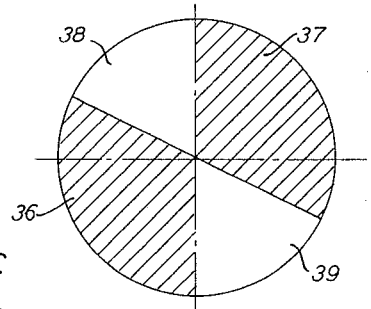
Figure 3C:
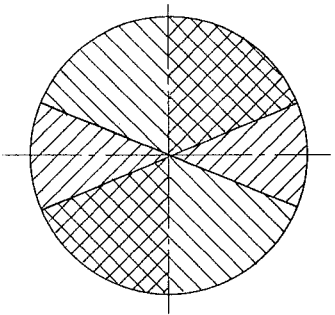

FIG. 3B shows the output pattern that would be produced if only mirror 12 had an aperture 21, while mirror 11 was reflective over its whole area. Shadow area 36 corresponds to sector 21 while shadow area 37 is the mirror image of area 36. Areas 38 and 39 both show light. When both mirrors 11 and 12 are used, with their apertures oriented as shown, i.e., rotated relative to each other, the result is the output pattern shown in FIG. 3C, a completely shadowed area. In other words, there is no oscillatory output. Thus total masking of oscillations is achieved with mirrors 11 and 12 as shown in FIG. 2, and yet two-thirds of the reflective surface of each mirror is available for generating multiple passes of the light beam through the active medium.

It can be appreciated from the foregoing that those portions of the output pattern of a potential oscillation that are not masked out by one of the mirrors and its mask must be masked by the other. In those arrangements where there is a precession of reflection points around a circle, as shown in FIG. 2, successive points on each mirror being separated by an angle $2\theta$ in the direction of precession, a relative rotation of the masked areas on the mirrors through an angle $\theta$ or multiple thereof can insure total masking while leaving enough reflecting areas to allow multiple transits of the light beam. In the case of an elliptical or other pattern of spots the rotation or shifting may be through a different angle. However, the masking pattern on one mirror is always rotated or shifted relative to that of the other mirror.

The principles of the invention have been explained thus far in terms of an amplifier where five traversals of the active medium take place and total masking is achieved with only one-third of the area of each mirror being masked. In practice it has been found that where the total mirror area available is 2A, the total area actually masked, whether on one or both mirrors, cannot be less than A/2. In other words, one-quarter or more of the total mirror area must be masked to achieve "total masking." In general, where more than a very few traverses are desired, greater areas than this are masked.

Figure 4A:
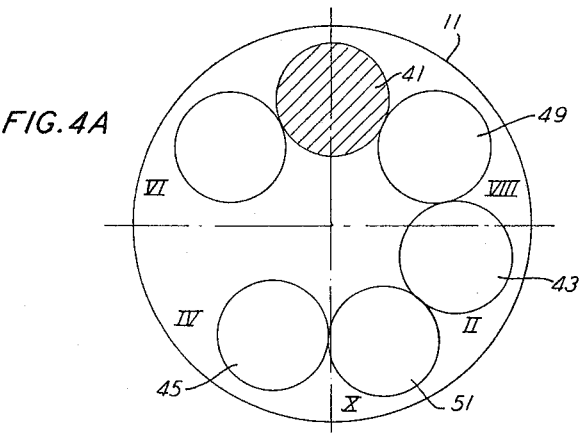
FIGS. 4A and 4B are views of masked mirrors for use in the arrangement of FIG. 1.
Figure 4B:
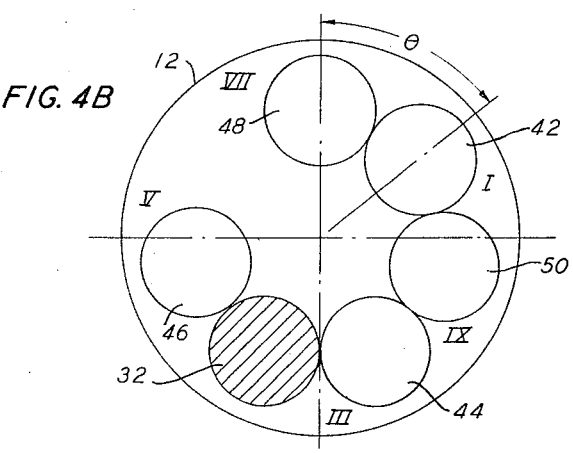

In FIGS. 4A and 4B there is shown a masking arrangement which achieves total masking while permitting eleven traversals of the active medium. For simplicity, only the masks have been shown, as seen looking down the optic axis. These make take the form of coatings on mirrors 11 and 12 of FIG. 1, or may be, for example, separate masks placed in front of mirrors 11 and 12. To expedite an understanding of the arrangement, FIGS. 4A and 4B are here designated as masked mirrors 11 and 12, respectively, as though the masks were integral with the mirrors. In operation the beam is introduced through an aperture or transparent portion 41 of masked mirror 11, passes through the active medium and impinges on masked mirror 12 at a circular reflecting portion 42. Preferably, although not necessarily, the diameter of portion 42 is roughly the same as that of the beam. This first portion 42 and the impingement and reflection, designated I, are rotationally displaced from entrance aperture 41 by the angle $\theta$. After reflection I the beam passes through the active medium and impinges on reflecting spot 43 on mirror 11, the reflection being designated II. The process continues, the reflections being designated by Roman numerals and the reflecting spots by numbers 42 through 51 until, after the eleventh traversal of the active medium, the beam exits through aperture 52 in mirror 12. It should be noted that successive reflections on any one mirror are separated from each other by the angle $2\theta$, while successive reflections from one mirror to the other are separated by the angle $\theta$. In the arrangement of FIGS. 4A and 4B, the output aperture is separated from the input aperture by the angle $4\theta$ in the direction of procession. However, it should be noted that the two mask patterns are substantially identical, and the pattern on mirror 12 is rotated relative to that on mirror 11 by the angle $\theta$. In general, where the mask patterns are substantially identical, the spacing of the reflective portions is a function of the angle $\theta$ and the rotation of one mask relative to the other is an integral multiple of $\theta$. Where the patterns are not identical, as might occur where the reflection pattern is an ellipse, for example, the rotation of the mask pattern on one mirror is still a function of the spacing of the reflection points.

FIG. 5 is a chart of various parameters for different numbers of traversals in an arrangement such as shown in FIG. 1. The term $\omega$ is the angle subtended by the light beam spot, while the term $\eta$ is a measure of masking efficiency based upon spot size and number of reflections to expedite the mask design. It is not a measure of the efficiency of the amplification process. The arrangements shown have a high masking efficiency, which allows relatively small transverse dimensions of the amplifying medium.

It can readily be seen from FIG. 5 that for the examples shown, the mask offset, i.e., the rotation of one mask relative to the other, is the angle $\theta$. In the examples shown, however, the reflection pattern in each case is a circle.

The foregoing has dealt with odd numbers of traversals of the active medium in all cases. The principles of the invention are applicable to even numbers of traversals also. In addition, as pointed out before, reflection patterns of other than circular shape are possible. It can readily be appreciated that these principles make possible a multiplicity of traversals of an active medium by a beam to be amplified without the generation of oscillations.

The foregoing has been intended to illustrate and explain the principles of the invention. It is possible that applications of the principles to various arrangements may occur to workers in the art without departure from the spirit and scope of the invention.

What is claimed is:

1. A light beam amplifier comprising an active medium, means for exciting said medium to a negative temperature state, means for introducing a light beam to be amplified into said medium, means for producing multiple traversals of the beam through said medium while suppressing oscillations comprising a pair of opposed spaced reflectors disposed adjacent said medium in the path of the light beam, at least one of said reflectors having a curved reflecting surface for redirecting the beam through the medium, and means defining non-reflective areas on said reflectors for suppressing oscillations, the non-reflective area of one reflector being displaced relative to the non-reflective area of the other reflector.

2. A light beam amplifier as claimed in claim 1 wherein the beam in making multiple traversals of the medium describes a pattern of reflection spots on each reflector, the spots on either reflector being separated by the angle $2\theta$ where $$\cos \theta = 1 - \frac{d}{2f}$$

where $d$ is the spacing of said reflectors and $f$ is the focal length of the curved reflector, and the non-reflective area of one reflector is rotated relative to the no-reflective area of the other reflector about the axis of the amplifier through an angle $n\theta$ where $n$ is an integer.

3. A light beam amplifier as claimed in claim 1 wherein both of said reflectors have spherical concave reflecting surfaces, each reflector having a sector shaped transparent non-refiecting area, said non-reflecting area of one reflector being rotated about the axis of the amplifier through the angle $\theta$ relative to the non-reflective area of the other reflector, $\theta$ being defined by $$\cos \theta = 1 - \frac{d}{2f}$$

where $d$ is the spacing of the reflectors and $f$ their focal length.

4. For use in an optical maser amplifier for the amplification of light beams, a mirror arrangement for producing multiple reflections of the beam through the amplifying medium, said mirror arrangement comprising first and second spaced opposed mirrors at least one of which has a concave reflecting surface, said mirror arrangement including means for preventing the generation of oscillations in the amplifier, said means comprising at least one area of each mirror which is rendered non-reflecting, the combined non-reflecting areas of the mirrors being at least twenty-five percent of the total combined area of the mirrors, the non-reflecting area of one mirror being displaced relative to the non-reflecting area of the other mirror.

5. A mirror arrangement as claimed in claim 4 wherein the more reflective area of said one mirror is rotated through an angle $n\theta$ about an axis common to the two mirrors relating to the non-reflecting area of the other mirror where $n$ is an integer and $\theta$ is defined by $$\cos \theta = 1 - \frac{d}{2f}$$

where $d$ is the mirror spacing and $f$ is the focal length of the mirror having the concave reflecting surface.

6. A mirror arrangement as claimed in claim 4 wherein the non-reflecting areas of said mirrors comprise transparent areas in said mirrors to permit passage of the light beam.

7. A mirror arrangement as claimed in claim 4 wherein at least some of the non-reflecting areas of said mirrors are produced by opaque masks.

8. An optical maser amplifier comprising an active medium, means for exciting said medium to a negative temperature state, a pair of opposed, spaced mirrors having concave reflecting surfaces adjacent the ends of said medium and axially aligned therewith, said mirrors forming a resonator, means for introducing a beam of light through one of said mirrors at a point spaced from the axis thereof into said active medium, the direction of introduction of the beam being such that the beam is multiply reflected by the mirrors whereby it makes multiple traversals of the active medium, successive points of reflection of the beam on either mirror being separated by the angle $2\theta$ where $$\cos \theta = 1 - \frac{d}{2f}$$

where $d$ is the spacing between the mirrors and $f$ is their focal length, and means for preventing degradation of the beam by oscillations within said resonator comprising means establishing a pattern of non-reflective areas on each of said mirrors, the pattern of non-reflective areas on one of said mirrors being rotated through an angle $n\theta$ with respect to the pattern of non-reflective areas of the other mirror where $n$ is an integer.

9. An optical maser amplifier as claimed in claim 8 wherein the total combined non-reflective areas of the two mirrors is at least twenty-five percent of the total combined area of the two mirrors.

References Cited

UNITED STATES PATENTS 3,136,959 6/1964 Culver _____ 331—94.5
3,154,751 10/1964 Wentz et al. _____ 330—4.3

ROY LAKE, *Primary Examiner.*

D. R. HOSTETTER, *Examiner.*